Patented June 11, 1929.

1,717,198

UNITED STATES PATENT OFFICE.

NEWELL SIMMONS FERRY, OF DETROIT, MICHIGAN, ASSIGNOR TO PARKE-DAVIS & COMPANY, OF DETROIT, MICHIGAN, A CORPORATION OF MICHIGAN.

IMMUNIZING PRODUCT AND METHOD OF PRODUCING THE SAME.

No Drawing. Application filed June 2, 1924, Serial No. 717,436. Renewed December 8, 1928.

The invention relates to the preparation of an immunizing product, adapted to be used for the prevention and cure of disease and consists in a new product of manufacture having immunizing properties, and a new method of preparing the same.

It has long been known among bacteriologists, that certain disease-producing microorganisms have associated with them, other products containing bacterial antigens which have been given various names such as, endotoxin, autolysate, aggressin, bacterial protein, etc. These various products are known to have immunizing properties and various attempts have been made to isolate the same. However, it has always been considered that the antigen or immunizing portion is closely bound to the protoplasm or endoplasm of the bacterial cell and therefore, that it could only be separated as a result of the dissolution of the cell. Thus, according to the usual process of preparation of a soluble antigen, the microorganisms are dissolved by one means or another, and the bacterial débris separated from the solvent and thrown away. It has frequently been the practice to wash the organisms during the process, but the washings have always been thrown away, since they were never considered of any value.

I have discovered, however, that it is possible to obtain the antigens from a large number of the disease-producing microorganisms, such as the typhoid bacillus, gonococcus, streptococcus, pneumococcus, and others, by growing the microorganisms on media permitting the retention with the organisms of the antigens and then merely washing the antigens from the cells with a suitable fluid without necessitating the breaking down of the cell itself. I believe this due to the fact, that the antigens are loosely bound to the bacterial cells or must be associated with the ectoplasm, rather than the endoplasm, and because of this relationship, it is possible to separate the antigens from the cells by a washing operation. The time of contact of the washing fluid with the microorganisms is limited so as to avoid any substantial extraction of bacterial toxins or proteins. As thus treated, I obtain in the washings antigens specific to the microorganisms, and the washings are substantially free from specific bacterial toxins and specific bacterial proteins of the organisms.

As an example of the preparation of an immunizing product according to my invention, the following procedure may be employed: The microorganisms are preferably grown on substantially solid culture media at ordinary incubator temperature (36 to 38° C.) for eighteen to twenty-four hours. The organisms are then scraped or washed off the media and suspended in a solvent for the antigens such as physiologic salt solution alone or containing extractives or solvents and shaken vigorously for ten to fifteen minutes in order to free the antigen from the cell. The suspension is then passed through a centrifuge at a high speed for clarification. The supernatant fluid or "centrifugate", containing the antigen or active principle, which we have termed the "ectoantigen", is reserved and the sediment composed of microorganisms is thrown away. To this fluid is added sufficient preservative to comply with the government standards and the product is then ready for use.

From the above description, it will be apparent that I have prepared a new immunizing product, containing antigens having properties useful in combating disease, and that this product has been prepared by a process which is entirely different from those which have heretofore been employed for this purpose.

What I claim as my invention is:—

1. An immunizing product comprising washings from disease-producing microorganisms, said washings containing antigens specific to said organisms and being substantially free from said organisms and from specific bacterial toxins and specific bacterial proteins of said organisms.

2. An immunizing product comprising washings from disease-producing microorganisms, said washings containing antigens specific to said organisms and being free from said organisms, said washings also being substantially free from specific bacterial toxins and specific bacterial proteins of said organisms, and a preservative incorporated in said washings.

3. An immunizing product comprising washings from disease-producing microorganisms grown on substantially solid culture media, said washings being separated from said organisms and containing antigens specific to said organisms.

4. An immunizing product comprising washings from disease-producing microorganisms grown on substantially solid culture media, said washings resulting from contact of a solvent for the antigens with the organisms for a limited period of time, said washings being separated from said organisms and containing antigens specific to said organisms.

5. The method of preparing an immunizing product consisting in growing microorganisms on media permitting the retention with the organisms of the antigens, washing said organisms with a solvent for the antigens and separating the solvent containing the antigens from the organisms.

6. The method of preparing an immunizing product consisting in growing the microorganisms on media permitting the retention with the organisms of the antigens, washing said organisms with a solvent for a limited period of time sufficient to obtain substantial amounts of the antigens in the solvent and to prevent removal of any substantial amounts of specific bacterial toxins and specific bacterial proteins of such organisms.

7. The method of preparing an immunizing product consisting in growing disease-producing microorganisms on substantially solid culture media, removing the organisms from said media, washing the organisms with a fluid to remove antigens therefrom, and separating the washing fluid from the organisms, thereby producing an immunizing liquid containing antigens.

8. The method of preparing an immunizing product consisting in growing disease-producing microorganisms on substantially solid culture media, removing the organisms from said media and suspending the same in physiologic salt solution, agitating the suspension to wash the antigens from the bacterial cells, centrifuging the suspension to separate the liquid from the sediment and retaining the washing liquid thereby producing the immunizing product.

In testimony whereof I affix my signature.

NEWELL SIMMONS FERRY.